United States Patent
Nakahara

(10) Patent No.: US 9,393,728 B2
(45) Date of Patent: Jul. 19, 2016

(54) TEMPERATURE CONTROL APPARATUS FOR PREFORM, TEMPERATURE CONTROL METHOD FOR PREFORM, RESIN CONTAINER AND METHOD FOR PRODUCING RESIN CONTAINER

(71) Applicant: NISSEI ASB MACHINE CO., LTD., Nagano (JP)

(72) Inventor: Atsushi Nakahara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 136 days.

(21) Appl. No.: 14/158,713

(22) Filed: Jan. 17, 2014

(65) Prior Publication Data

US 2014/0131920 A1    May 15, 2014

Related U.S. Application Data

(63) Continuation of application No. PCT/JP2012/068471, filed on Jul. 20, 2012.

(30) Foreign Application Priority Data

Jul. 20, 2011    (JP) .................................. 2011-159316

(51) Int. Cl.
| | |
|---|---|
| *B29C 45/78* | (2006.01) |
| *B29B 11/14* | (2006.01) |
| *B29B 11/08* | (2006.01) |
| *B29C 49/64* | (2006.01) |

(52) U.S. Cl.
CPC ............... *B29C 45/78* (2013.01); *B29B 11/08* (2013.01); *B29B 11/14* (2013.01); *B29B 2911/1464* (2013.01); *B29B 2911/14326* (2013.01); *B29B 2911/14433* (2013.01); *B29B 2911/14486* (2013.01); *B29B 2911/14633* (2013.01); *B29C 49/6427* (2013.01)

(58) Field of Classification Search
CPC .................................................... B29C 49/6427
See application file for complete search history.

(56) References Cited

U.S. PATENT DOCUMENTS

| | | | | |
|---|---|---|---|---|
| 3,341,644 A | * | 9/1967 | Allen ............................ | 264/550 |
| 3,949,033 A | * | 4/1976 | Uhlig ............................ | 264/529 |
| 5,229,142 A | * | 7/1993 | Yokobayashi ................ | 425/522 |
| 2012/0193838 A1 | * | 8/2012 | Bock et al. .................... | 264/537 |

FOREIGN PATENT DOCUMENTS

| | | | |
|---|---|---|---|
| JP | 02-128826 | * | 5/1990 |
| JP | 03-051117 | | 3/1991 |
| JP | 03-290225 | | 12/1991 |
| JP | 07-205997 | | 8/1995 |
| JP | 2007-001187 | | 1/2007 |
| WO | 2010/149522 | * | 12/2010 |

OTHER PUBLICATIONS

International Search Report for International Application No. PCT/JP2012/068471.

* cited by examiner

*Primary Examiner* — Jill Heitbrink
(74) *Attorney, Agent, or Firm* — David L. Hoffman; Hoffman Patent Group

(57) ABSTRACT

The outer circumferential surface of a bottom 4 of a preform 1 and a lower site 3a of a trunk 3 continuous with the bottom 4 is mechanically brought into intimate contact with a cooling pot 16 to undergo reliable cooling. The trunk 3, excluding the lower site 3a of the trunk 3 continuous with the bottom 4, is heated to a predetermined temperature by a heating block 17. When blow-molded, the so treated preform 1 can provide a container having a bottom of a desired thickness and having a uniformly stretched thin-walled trunk.

9 Claims, 7 Drawing Sheets

TEMPERATURE CONTROL APPARATUS FOR PREFORM, TEMPERATURE CONTROL METHOD FOR PREFORM, RESIN CONTAINER AND METHOD FOR PRODUCING RESIN CONTAINER

CROSS REFERENCE TO RELATED APPLICATIONS

This application is a continuation of International Patent Application No. PCT/JP2012/068471, having an international filing date of Jul. 20, 2012, which designated the United States and which claims priority from Japanese Patent Application No. 2011-159316 filed on Jul. 20, 2011, the entirety of both of which are incorporated herein by reference.

BACKGROUND

1. Technical Field

This invention relates to a temperature control apparatus for a preform and a temperature control method for a preform, which apparatus and method control the temperature of an injection molded preform.

The present invention also relates to a resin container, and a method for producing a resin container.

2. Background Art

A container manufactured by blow molding a bottomed preform using polyethylene terephthalate (PET) as a resin is known. The preform is produced by injection molding, and subjected to treatment involving predetermined temperature control (see, for example, Patent Document 1). After the preform is controlled to a predetermined temperature state, it is blow-molded and stretched to obtain a container of a desired shape. The resin container manufactured by blow molding is widely used as a container which is easy to design, excellent in mass producibility, lightweight and also excellent in impact resistance.

Glass bottles are used by preference as containers accommodating cosmetics, milky lotions, etc. Containers for cosmetics are required to have an appearance, which enables the containers themselves to be worth appreciating aesthetically, in order to stimulate consumers' appetite for purchase. From this point of view, glass bottles are satisfactory in that they have a profound feel or a quality appearance, and can retain a beautiful state even after repeated use. The glass bottles, however, are heavy and tend to break, and also have the drawback of high costs involved in transportation and production.

In recent years, the use of resin containers in place of glass bottles, as containers for cosmetics, has begun to be considered. The resin containers are advantageous in that they are resistant to breakage, lightweight and easy to handle, and inexpensive. However, they pose difficulty in having an aesthetic appearance expected of glass bottles, such as a profound feel or a quality appearance. They involve the problem that they do not fit consumers' image of the cosmetics containers. Thus, a contrivance to impart an aesthetic appearance, comparable to that of glass containers, to the resin containers becomes necessary.

Glass bottles containing cosmetics, etc., for example, are formed in a large wall thickness for the emphasis of a quality appearance or a profound feel. Although the shape of the container is modified, as appropriate, in accordance with the contents, it is common practice to render the bottom of the container considerably thick-walled, and its trunk uniformly thin-walled compared with the bottom. Similarly, therefore, it is desirable that the resin container be also provided with a thick-walled bottom and a uniformly thin-walled trunk.

As a method for producing a resin container, injection molding or blow molding exists. With the injection molding method, the resulting container is generally limited to one in which the inner diameter of its mouth and the inner diameter of its trunk are equal, and the amount of resin necessary for molding is large. To produce a bottle-shaped container with the inner diameter of the mouth smaller than the inner diameter of the trunk, therefore, the blow molding method has to be employed.

The blow molding method is present in two types, a hot parison method in which a preform is not cooled to room temperature, but is blow-molded by effective use of the residual heat (internal heat quantity) during injection molding; and a cold parison method in which a preform is once cooled to room temperature, then reheated and blow-molded. For the molding of a medium- to small-sized container mainly containing a cosmetic or the like, the hot parison method, which is advantageous from the aspects of energy consumption and shapability, is usually used.

The molding of a preform is generally performed by injecting and charging a molten resin into an injection space formed by an injection cavity mold, an injection core mold, and a neck mold. The molten resin is quenched, while being solidified, down to a temperature of the order of 80° C. on its inner and outer surfaces in contact with the cooled injection cavity mold and injection core mold to form a skin layer on the surface. Since the skin layer is formed, the preform can be released from the injection mold, with its shape being retained. On the other hand, the interior of the preform has not been completely cooled yet, but is still at a high temperature of the order of 140° C.

With the hot parison method, the residual heat of each part of the preform is proportional to the wall thickness and, the larger the wall thickness, the easier the stretching of the preform becomes. Moreover, if the wall is thinned by stretching and increased in surface area thereby, the temperature of the stretched site lowers to make stretching difficult. Thus, stretching shifts to an adjacent site where the wall is relatively thick and the temperature is relatively high. Hence, a technique is adopted which, in consideration of the standard values required of a finally molded container, adjusts the wall thickness of each part of the preform, and achieves the desired wall thickness distribution in the final container.

In order to adjust the preform after injection molding to an appropriate temperature state, a temperature control device may be provided. The temperature control device is effective in mitigating an undesirable temperature distribution of the preform, which occurs during injection molding, or in locally lowering the temperature of a site to be increased in wall thickness, such as the shoulder or bottom of the container.

Even if it is attempted to impart a temperature distribution to the preform by a conventional temperature control device, however, heat is gradually transmitted to an adjacent site. Thus, it has been impossible to impart a temperature distribution which can be definitely distinguished from the temperature of the adjacent site. Hence, it has been technically extremely difficult to produce a resin container having a thick-walled bottom and a uniformly thin-walled trunk adjacent to each other. As the wall thickness is increased, moreover, uniform stretching by blow molding is more difficult, thus having posed difficulty in molding a thick-walled container free from wall thickness unevenness or distortion.

For the reasons mentioned above, a method for forming a resin container, which has a thick-walled bottom, a relatively thin-walled uniform-thickness trunk (having a satisfactory wall thickness distribution as a small- or medium-sized container accommodating a cosmetic or the like), and the feel of a glass bottle, has not been established yet.

PRIOR ART DOCUMENTS

Patent Documents

Patent Document 1: JP-A-3-51117.

SUMMARY OF THE INVENTION

Problems to be Solved by the Invention

The present invention has been accomplished in the light of the above-mentioned circumstances. It is an object of the present invention to provide a temperature control apparatus for a preform which can provide a container having an improved look for presenting an aesthetic appearance fitting consumers' image of containers. Specifically, it is the object of the present invention to provide a temperature control apparatus for a preform for obtaining a resin container having a thick-walled bottom and a thin-walled uniform-thickness trunk adjacent to each other.

The present invention has also been accomplished in the light of the above-mentioned circumstances. It is another object of the present invention to provide a temperature control method for a preform which can obtain a container having an improved look for presenting an aesthetic appearance fitting consumers' image of containers. Specifically, it is another object of the present invention to provide a temperature control method for a preform for obtaining a resin container having a thick-walled bottom and a thin-walled uniform-thickness trunk adjacent to each other.

It is still another object of the present invention to provide a resin container improved in look which has been manufactured using a preform temperature-adjusted by the temperature control apparatus for a preform.

It is a further object of the present invention to provide a method for producing a resin container which can obtain a resin container improved in look, the resin container having been manufactured using a preform temperature-adjusted by the temperature control method for a preform.

Means for Solving the Problems

A temperature control apparatus for a preform according to a first embodiment of the invention, intended to attain the above-mentioned objects, comprises: a temperature control pot contacting the outer circumferential surface of a bottom of a bottomed preform and a part of a peripheral portion of the bottomed preform continuous with the bottom; a temperature control block disposed outside the peripheral portion of the bottomed preform; and pressing drive means for allowing the temperature control pot to intimately contact and hold a bottom wall surface of the bottomed preform.

With the present invention according to the first embodiment, a site of the bottom of the bottomed preform is disposed at a waiting position above the temperature control pot, and the pressing drive means raises the temperature control pot for access, whereby the bottom wall surface of the bottomed preform is intimately contacted with the temperature control pot and held thereby. As a result, the bottom of the bottomed preform intimately contacts the inner wall surface of the temperature control pot without clearance. Thus, temperature control can be performed unerringly from outside the bottomed preform.

Consequently, the temperature state of the bottomed preform, and the shape (wall thickness) of the bottom can be reliably controlled to a desired state. Thus, it becomes possible to form a bottomed preform for obtaining a container improved in look.

A temperature control apparatus for a preform according to a second embodiment of the invention, intended to attain the above-mentioned objects, comprises: a temperature control pot for holding the outer circumferential surface of a bottom of a bottomed preform and a part of a peripheral portion of the bottomed preform continuous with the bottom; a temperature control block disposed outside the peripheral portion of the bottomed preform; a temperature control core inserted into an inside of the bottomed preform, and having a leading end portion contacting the inner circumferential surface of the bottom and the part of the peripheral portion continuous with the bottom; and pressing drive means for holding a bottom wall surface of the bottomed preform between the temperature control pot and the temperature control core, and bringing the temperature control pot and the temperature control core close to each other relatively so as to make intimate contact with the bottom and the peripheral portion and hold them.

With the present invention according to the second embodiment, the bottom of the bottomed preform is disposed between the temperature control pot and the temperature control core, and the pressing drive means brings the temperature control pot and the temperature control core close to each other, with the result that the bottom wall surface of the bottomed preform is held in intimate contact with them. As a result, the bottom of the bottomed preform settles between the temperature control pot and the temperature control core and intimately contacts them without clearance. Thus, temperature control can be performed unerringly from inside and outside the bottomed preform.

Consequently, the temperature state of the bottomed preform, and the shape (wall thickness) of the bottom can be reliably controlled to a desired state. Thus, it becomes possible to form a bottomed preform for obtaining a container improved in look.

A temperature control apparatus for a preform according to a third embodiment is the temperature control apparatus for a preform according to the second embodiment, wherein the temperature control pot is a pot for cooling, the temperature control core is a core for cooling, and the temperature control block is a block for heating.

With the present invention according to the third embodiment, the bottom of the bottomed preform and the part of the peripheral portion continuous with the bottom can be cooled reliably, and the peripheral portion can be heated to attain a desired temperature state.

A temperature control apparatus for a preform according to a fourth embodiment is the temperature control apparatus for a preform according to the third embodiment, wherein the bottomed preform has the bottom increased in wall thickness relative to the peripheral portion continuous with the bottom, the wall-thickened bottom being disposed between the temperature control pot and the temperature control core.

With the present invention according to the fourth embodiment, the bottom of the bottomed preform is increased in wall thickness relative to the peripheral portion continuous with the bottom. Thus, at least the bottom and the part of the peripheral portion continuous with the bottom are increased in wall thickness as compared with the other sites. Since the temperature of the other part of the peripheral portion is relatively raised, a container having the bottom of the desired thickness and the peripheral portion stretched uniformly with a thin wall can be produced when blow molding is performed. Heating or raising the temperature relatively includes the manner of not lowering the temperature of the peripheral portion while cooling the bottom. The situation of heating or temperature raising depends on molding conditions such as resin.

A temperature control method for a preform according to a fifth embodiment, intended to attain the above-mentioned objects, comprises: forming a bottomed preform by injection molding, the bottomed preform having a bottom and a peripheral portion continuous with the bottom, and having a wall thickness of the bottom increased relative to the peripheral portion; and bringing the outer circumferential surface of the bottom of the bottomed preform and a part of the peripheral portion continuous with the bottom into intimate contact with a temperature control pot, while holding the outer circumferential surface by the temperature control pot, for temperature control; and relatively heating a site of the peripheral portion, excluding the part of the peripheral portion continuous with the bottom of the bottomed preform, to a predetermined temperature.

With the present invention according to the fifth embodiment, in the bottomed preform having the bottom formed with a large wall thickness, the inner wall surface and the outer wall surface of the bottom of the bottomed preform and the part of the peripheral portion continuous with the bottom are brought into intimate contact with and held by the temperature control pot to effect temperature control. By so doing, the thick-walled bottom of the bottomed preform and the part of the peripheral portion continuous with the bottom can be reliably temperature-controlled. Moreover, the temperature of the site of the peripheral portion, excluding the bottom and the part of the peripheral portion continuous with the bottom, can be relatively raised to the predetermined temperature.

Consequently, temperature control of the bottomed preform can be exercised so as to obtain a container improved in look. In particular, a resin container having a thick-walled bottom and a thin-walled uniform wall thickness peripheral portion adjacent to each other can be produced.

A temperature control method for a preform according to a sixth embodiment of the invention is the temperature control method for a preform according to claim 5, wherein the bottom and the part of the peripheral portion continuous with the bottom are disposed between a pot for cooling and a core for cooling, and the pot for cooling and the core for cooling are brought close to each other, whereby the outer circumferential surface of the bottom and the part of the peripheral portion continuous with the bottom is cooled upon intimate contact with the pot for cooling, and the inner circumferential surface of the bottom and the part of the peripheral portion continuous with the bottom is cooled upon intimate contact with the core for cooling.

With the present invention according to a sixth embodiment, the bottom and the part of the peripheral portion continuous with the bottom are held between the pot for cooling and the core for cooling, and efficiently cooled from both sides. Furthermore, a resin container having a thick-walled bottom and a thin-walled uniformly-thickness peripheral portion adjacent to each other can be produced more efficiently.

A temperature control method for a preform according to a seventh embodiment of the invention is the temperature control method for a preform according to the sixth embodiment, wherein the peripheral portion of the bottomed preform, excluding the bottom and the part of the peripheral portion continuous with the bottom, is relatively heated to a predetermined temperature either in a completely noncontact state, or in a partly contacted state on an inner circumferential surface of the peripheral portion.

With the present invention according to the seventh embodiment, the peripheral portion of the bottomed preform, excluding the bottom and the part of the peripheral portion continuous with the bottom, is temperature-controlled to a predetermined temperature in a completely noncontact state, or in a partly contacted state on an inner circumferential surface of the peripheral portion. Thus, the bottom and the peripheral portion arranged adjacently can be subjected to different temperature conditions with ease and in a sharply distinct manner.

Effects of the Invention

The temperature control apparatus and the temperature control method for a preform according to the present invention make it possible to obtain a preform which provides a container improved in look. In particular, a temperature distribution can be properly imparted to a preform for obtaining a resin container having a thick-walled bottom and a thin-walled uniform-thickness trunk adjacently disposed.

Besides, the resin container of the present invention, and the method for producing the resin container can be acquired by using a preform for improving look. In particular, a resin container having a thick-walled bottom and a thin-walled uniform-thickness trunk adjacently disposed can be formed.

DESCRIPTION OF EXEMPLARY EMBODIMENTS

Mode for Carrying Out the Invention

A temperature control apparatus for a preform will now be described based on FIGS. 1 to 4.

Figure 1:
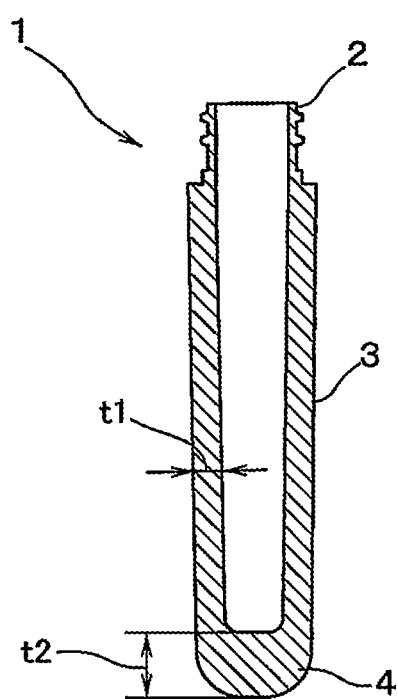
FIG. 1 is a vertical sectional view of an injection molded preform.
Figure 2:
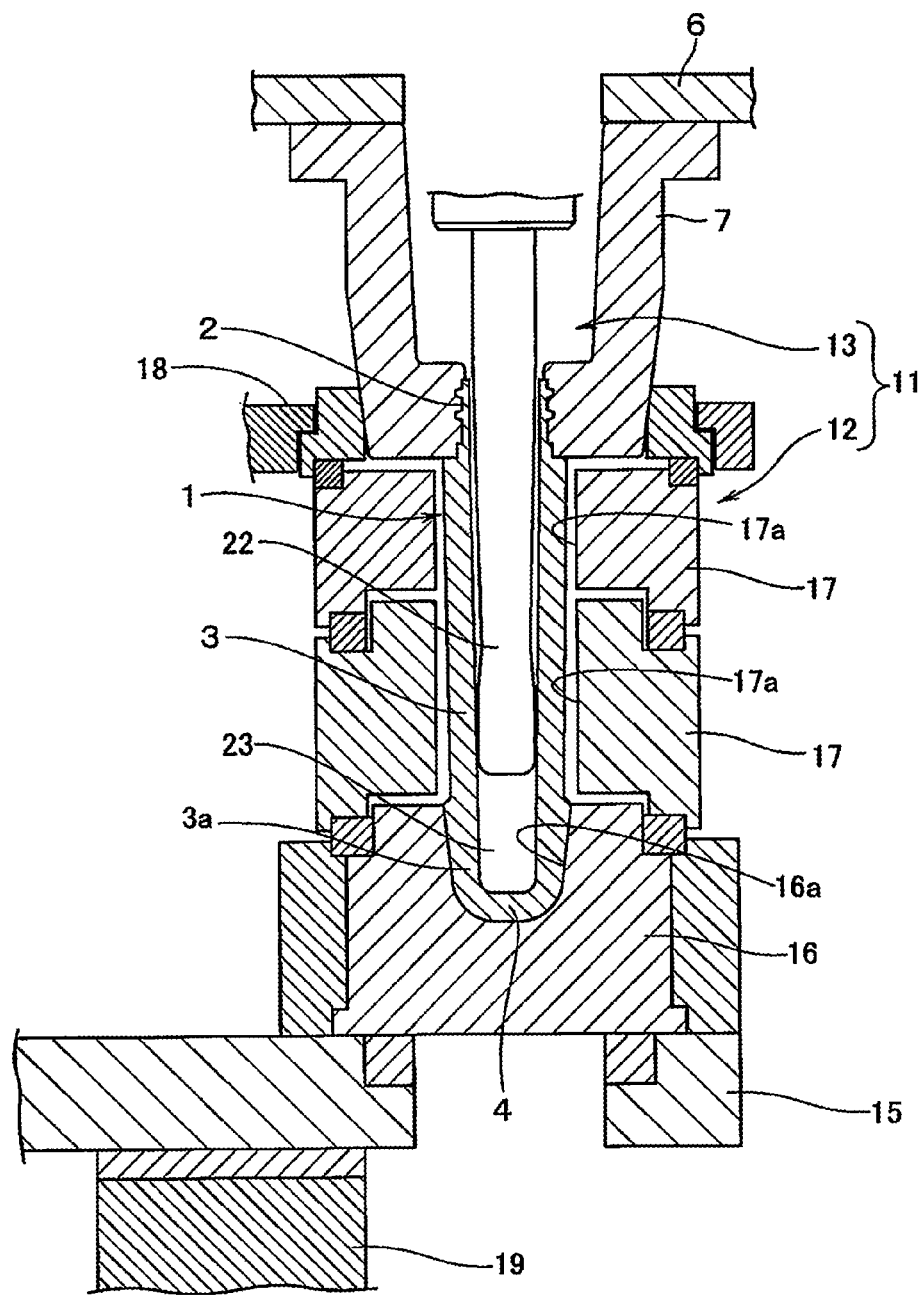
FIG. 2 is a sectional view of a temperature control apparatus according to an embodiment of the present invention.
Figure 3:
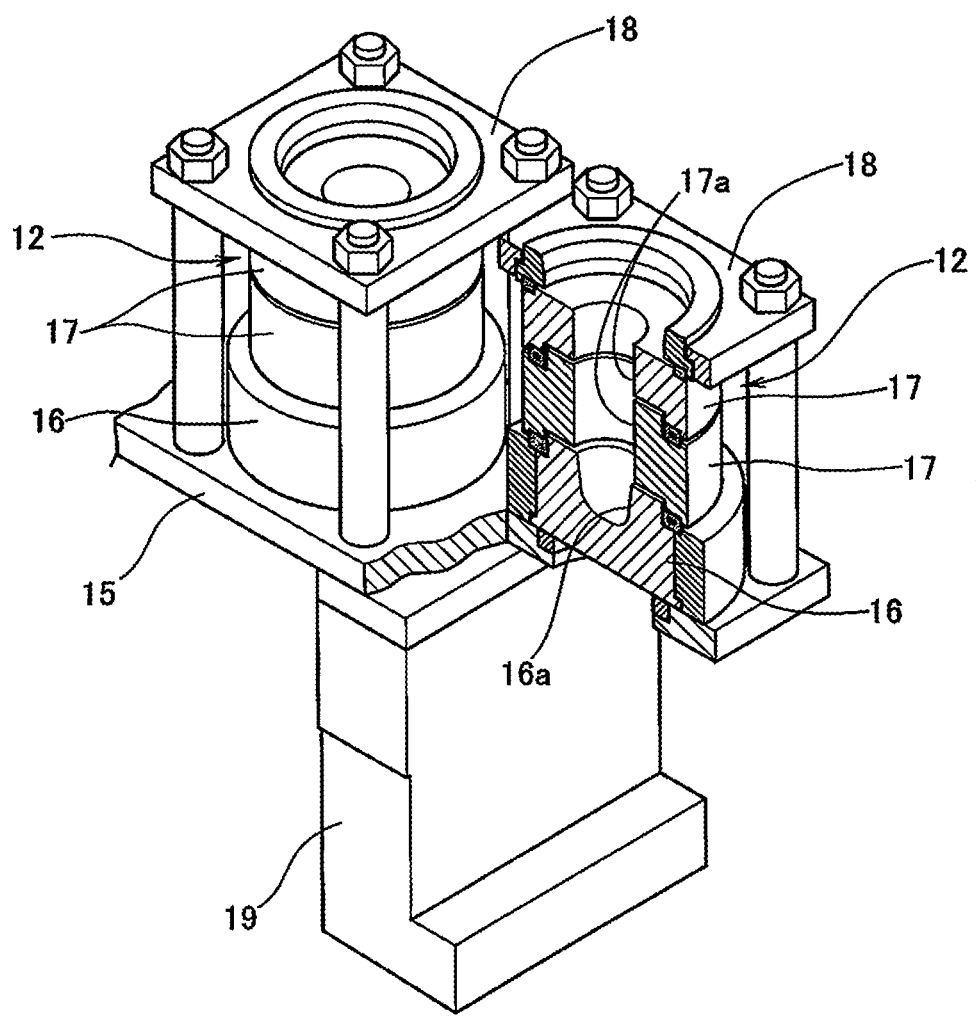
FIG. 3 is an appearance drawing of a temperature control pot.
Figure 4:
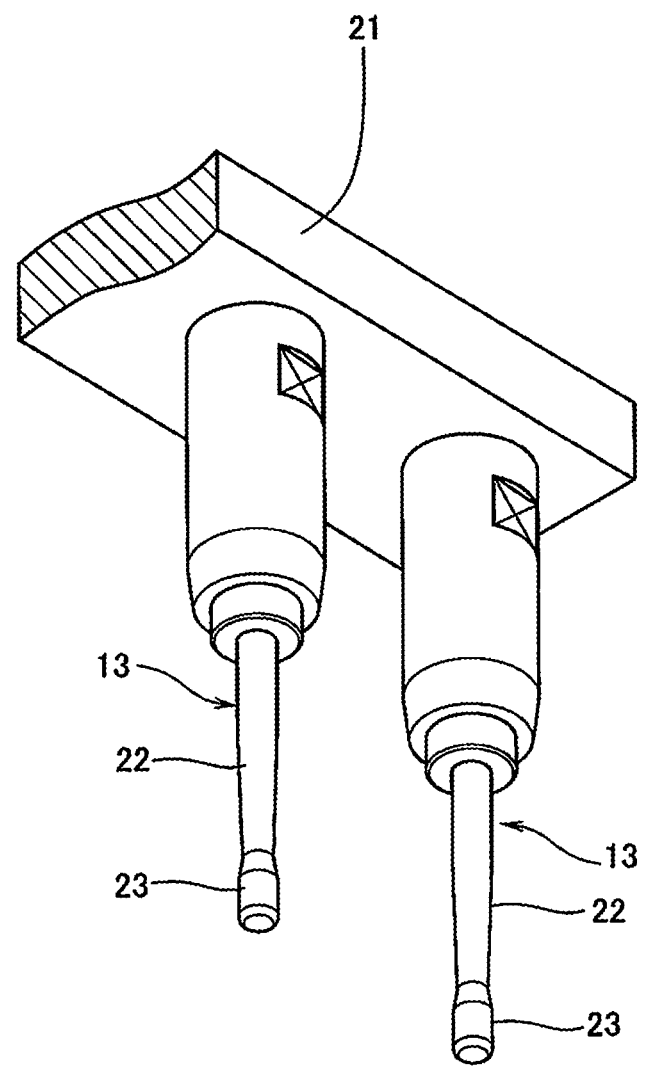
FIG. 4 is an appearance drawing of a temperature control core.

FIG. 1 shows a section representing the appearance of an injection molded preform. FIG. 2 shows a section of a temperature control apparatus according to an embodiment of the present invention. FIG. 3 shows the appearance of a temperature control pot equipped with a cooling pot and a heating block. FIG. 4 shows the appearance of a temperature control core.

The temperature control apparatus for a preform according to the present invention is an apparatus for adjusting the temperature of a resin-made bottomed preform and the wall thickness of its bottom to a desired state, the preform having been injection molded. The preform adjusted to the desired temperature and wall thickness is blow-molded to form a container. In order that a container having a peripheral portion (trunk) free from a uneven wall thickness distribution, having a bottom locally increased in wall thickness, and having the degree of transparency and the degree of gloss maintained in a uniform state is obtained by blow molding, the temperature and wall thickness of the preform are adjusted by the temperature control apparatus of the present invention. The resulting container is used, for example, as a container for a cosmetic or the like, which has an aesthetic appearance fitting consumers' image of containers and whose look is important.

A device for producing a container from a preform is equipped with at least an injection molding device for injection molding a bottomed preform; a temperature control apparatus for adjusting the temperature and wall thickness of the injection-molded bottomed preform to a desired state; and a blow molding device for blow molding the temperature-controlled bottomed preform to form a hollow container. The bottomed preform is sequentially transported to the injection molding device, the temperature control apparatus, and the blow molding device, for example, by a neck mold of a rotary table rotatably held on the blow molding device.

With the injection molding device, a bottomed preform (preform) 1 as shown in FIG. 1 is injection-molded. The preform 1 has a mouth/head 2 having a thread groove formed therein, a trunk 3 disposed below the mouth/head 2, and a bottom 4 which becomes a bottom surface portion of a hollow container after blow molding. That is, the preform 1 has the trunk 3 disposed as a peripheral portion continuous with the bottom 4. In the preform 1, relative to the wall thickness t1 of the trunk 3, the wall thickness t2 of the bottom 4 is rendered equal to or larger than the wall thickness t1 of the trunk 3. In an embodiment, t1 is set at 2.5 mm to 5.0 mm, t2 is set at 2.5 mm to 15.0 mm, and t2/t1=1 to 3. The injection-molded preform 1 is supplied to the temperature control apparatus.

The temperature control apparatus will be described based on FIGS. 2 to 4.

As shown in FIG. 2, the preform 1 has the mouth/head 2 held by a neck mold 7 provided on a rotary table 6, and is supplied in this state to a temperature control apparatus 11. The temperature control apparatus 11 is equipped with a temperature control pot 12 surrounding an outside part of the preform 1, and a temperature control core 13 inserted into an inside part of the preform 1.

As shown in FIGS. 2 and 3, a plurality of the temperature control pots 12 as a set are fixed to a pot base 15. The temperature control pot 12 is composed of a cooling pot 16, as a temperature control pot, and two heating blocks 17, as temperature control blocks, which are integrated via a coupling stand 18 and fixed to the pot base 15.

The cooling pot 16 has an inner wall surface 16a holding an outer circumferential surface portion of the bottom 4 of the preform 1 and a lower site (a part of a peripheral portion) 3a of the trunk 3 continuous with the bottom 4. The heating block 17 has an inner wall surface 17a opposed in a noncontact manner to the outer circumferential surface of a site of the trunk 3 of the preform 1, except the lower site 3a. In the drawings, two of the heating blocks 17 stacked are illustrated, but there may be the single heating block 17 or a stack of three of the heating blocks 17. Each heating block can be independently temperature-controlled and, for example, its temperature can be set, as appropriate, in the range of 100 to 450° C. Similarly, the temperature of the cooling pot 16 can be controlled, for example, in the range of 10 to 90° C.

The pot base 15 is furnished with a raising/lowering device 19 as a pressing drive means, and a plurality of the temperature control pots 12 are raised or lowered by the raising/lowering device 19 via the pot base 15.

As shown in FIGS. 2 and 4, a plurality of the temperature control cores 13 provided as a set are fixed to a core base 21. The temperature control core 13 has a core 22 to be inserted into the preform 1, and the leading end site of the core 22 constitutes a cooling core portion 23 as a leading end part which contacts and holds an inner circumferential surface portion of the bottom 4 of the preform 1 and the lower site 3a of the trunk 3 continuous with the bottom 4. In the core 22, the diameter of the cooling core portion 23 as the leading end part is large, and the site other than the cooling core portion 23 is inserted into the preform 1 without contacting the inner wall surface of the trunk 3.

If the site other than the cooling core portion 23 (i.e., core 22) makes no contact, a uniform temperature distribution can be imparted (in a sectional direction) to the trunk of the preform 1. Thus, satisfactory results are obtained by molding which enables the trunk of a container to be equally stretched (in the sectional direction) (for example, for formation of a circular container). In the case of the trunk of a container of a quadrilateral shape or the like having corners (as a sectional shape), however, the trunk is evenly stretched in the absence of contact. Thus, the cornered parts are necessarily subjected to a high stretch ratio, and tend to be thin-walled. In this case, the core 22 is brought into substantial contact with the portions of the preform 1 having a high stretch ratio (the portions corresponding to the corners) (the substantial contact including the state of approach to a degree to which the core 22 is deemed to contact), thereby lowering the temperature of those portions. By so doing, the corners of the container can be inhibited from becoming thin-walled. This is because stretching begins in the noncontact portion with higher residual heat, and stretching minimally takes place at the contact portion decreased in residual heat. In producing a quadrilateral container, for example, a quadrilateral core 22 is used, and substantially contacted with the portions of the preform 1 which will become the corners of the resulting container. By this measure, a quadrilateral container having sufficient wall thickness at the corners can be produced.

Inside the temperature control core 13, a circuit for flowing a temperature control medium such as water or an oil is provided (not shown), and the temperature can be set, for example, in the range of 10 to 90° C.

The core base 21 is equipped with a raising/lowering device as a pressing drive means (not shown), and a plurality of the temperature control cores 13 are raised or lowered by the raising/lowering device via the core base 21.

Since the preform 1 is supplied to the temperature control pot 12, the outer circumferential surface of the bottom 4 and the lower site 3a of the trunk 3 continuous with the bottom 4 becomes holdable by the inner wall surface 16a of the cooling pot 16 (a waiting state). Also, the temperature control core 13 is inserted into the preform 1, whereupon the inner circumferential surface of the bottom 4 and the lower site 3a of the trunk 3 continuous with the bottom 4 becomes holdable by the cooling core portion 23.

By the action of the raising/lowering device 19 of the pot base 15 and the raising/lowering device of the core base 21 (or one of these raising/lowering devices), the temperature control pot 12 and the temperature control core 13 are brought close to each other, whereby the bottom 4 of the preform 1 and the lower site 3a of the trunk 3 continuous with the bottom 4, disposed between the temperature control pot 12 and the temperature control core 13, are brought into intimate contact with, and held by, the inner wall surface of the temperature control pot 12 (or both of the inner wall surface of the temperature control pot 12 and the leading end part of the temperature control core 13).

In this state, the bottom 4 of the preform 1 and the lower site 3a of the trunk 3 continuous with the bottom 4 (i.e., the bottom wall surface) contact the inner wall surface 16a of the cooling pot 16 (or both the inner wall surface 16*a* of the cooling pot 16 and the cooling core portion 23 of the core 22), and get cooled thereby. Simultaneously, portions of the trunk 3, other than the bottom 4 of the preform 1 and the lower site 3*a* of the trunk 3 continuous with the bottom 4, are heated in a noncontact manner by the inner wall surfaces 17*a* of the heating blocks 17 (or between the inner wall surfaces 17*a* of the heating blocks 17 and sites of the core 22 other than the cooling core portion 23). When the preform 1 and the site other than the cooling core portion 23 (i.e., core 22) are partly contacted, the area of contact of the inner circumferential surface of the preform 1 is cooled and, at the same time, the outer circumferential surface of the preform 1 is heated in a noncontact manner. Furthermore, the bottom 4 of the preform 1 and the lower site 3*a* of the trunk 3 continuous with the bottom 4 can be mechanically pressed between the inner wall surface 16*a* of the cooling pot 16 and the cooling core portion 23, and thereby compressed and deformed into a shape more similar to the bottom of the final container. In this case, the material on the part of the bottom 4 is partially flowed to the trunk 3. By adjusting the bottom 4 of the preform 1 and the lower site 3*a* of the trunk 3 continuous with the bottom 4 to a wall thickness distribution and a shape closer to those of the final container, it becomes possible to impart the bottom shape of the final container which cannot be attained merely by cooling upon intimate contact.

By the above procedure, the temperature of the preform 1 and the shape (wall thickness) of the bottom are adjusted to a desired state. For example, cooling can be performed, with the wall thickness of portions of the preform 1 in the neighborhood of the bottom 4 being secured. Also, heating can be performed, with the wall thickness of the trunk of the preform 1 being relatively decreased. By so doing, stretchability during blow molding in a subsequent step is ensured. By adjusting the temperature and wall thickness of the preform 1 to the desired state, a container thick-walled at the bottom, having a proper wall thickness distribution in the peripheral portion (trunk), and uniform in the degree of transparency and the degree of gloss is obtained by blow molding. The resulting container can be used, for example, as a container for a cosmetic or the like, which has an aesthetic appearance fitting consumers' image of containers and whose look is important.

By using the temperature control apparatus 11 of the present invention, an appropriate temperature distribution and an appropriate shape (wall thickness) change can be provided to the preform 1 which is required to yield a container improved in look.

Based on FIGS. 5(*a*) to 5(*c*) to FIG. 7, the actions of the temperature control apparatus 11 of the above-mentioned configuration will be described to explain the temperature control method for a preform according to the present invention.

Figure 5:
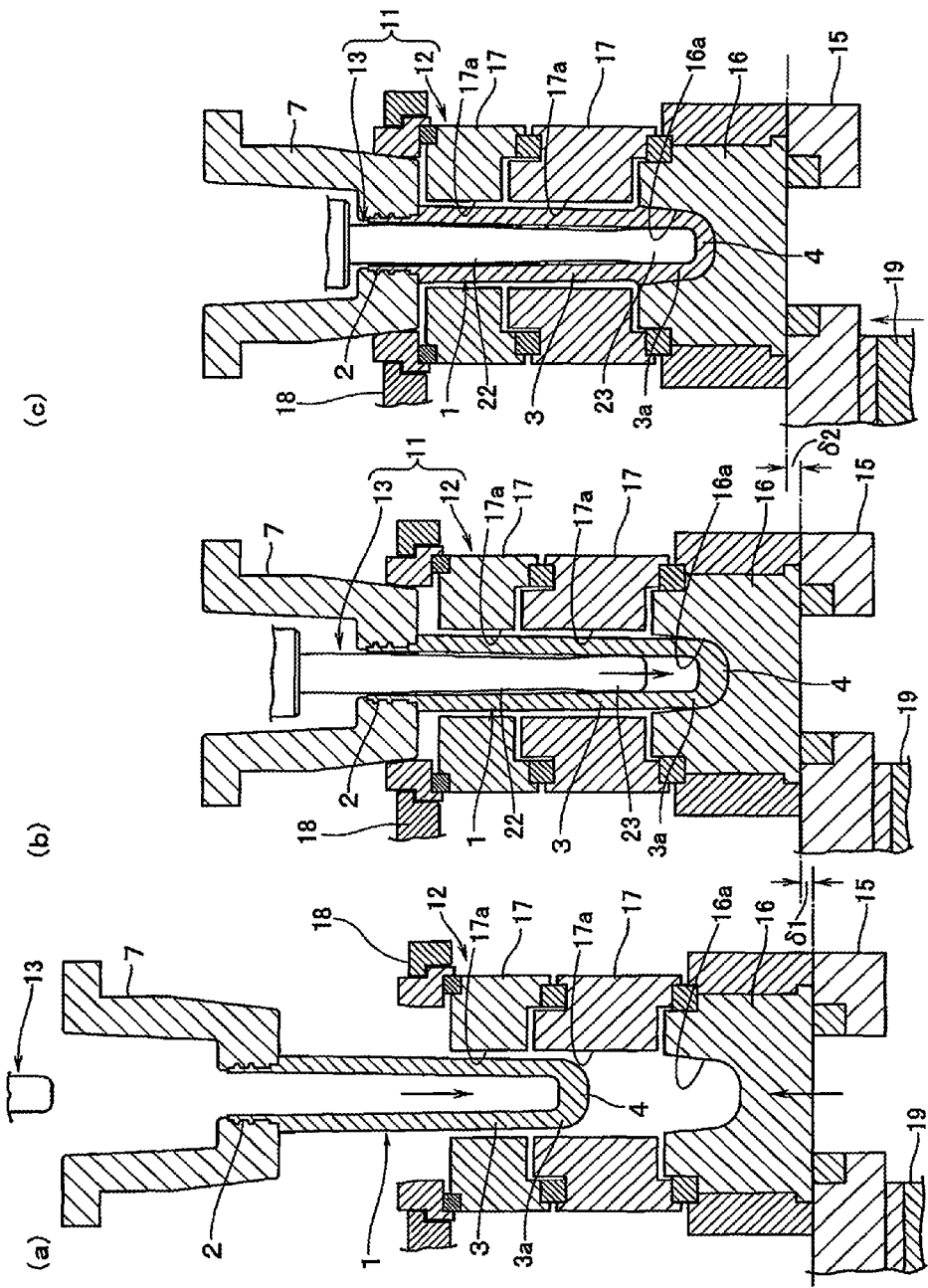
FIGS. 5(*a*), 5(*b*) and 5(*c*) are a process chart of temperature control actions.
Figure 6:
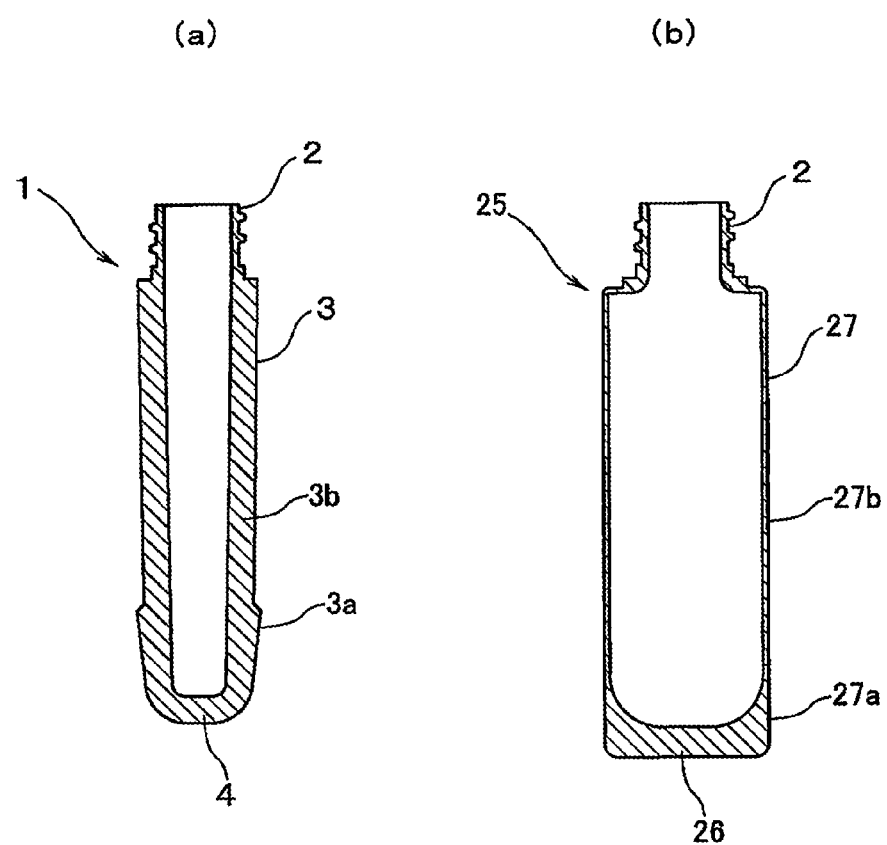
FIGS. 6(*a*) and 6(*b*) are sectional views of the preform and a container.

FIG. 5(*a*) shows a section of a state in which the preform 1 is supplied to the temperature control pot 12 (i.e., a waiting state). FIG. 5(*b*) shows a section of a state in which the wall surface of the bottom of the preform 1 is intimately contacted with the cooling pot 16 and cooled thereby. FIG. 5(*c*) shows a section of a state in which the bottom 4 of the preform 1 is pressed and held between the cooling pot 16 of the temperature control pot 12 and the cooling core portion 23 of the temperature control core 13. FIG. 6(*a*) shows a section of the preform 1 temperature-controlled to a desired state, while FIG. 6(*b*) shows a section of a container after blow molding. FIG. 7 shows the appearance status of the container.

The cooling pot 16 of the temperature control pot 12 is adjusted to a necessary temperature for predetermined cooling, whereas the heating block 17 is adjusted to a necessary temperature for predetermined heating. Moreover, the cooling core portion 23 of the temperature control core 13 is adjusted to a necessary temperature for predetermined cooling.

As shown in FIG. 5(*a*), a plurality of the temperature control pots 12 are positioned at predetermined positions (caused to wait) by the raising/lowering device 19 via the pot base 15. Then, the temperature control pot 12 is raised by a desired height (δ1) (FIG. 5(*b*)) so that the bottom 4 of the preform 1 and the lower site 3*a* of the trunk 3 continuous with the bottom 4 can intimately contact the inner wall surface 16*a* of the cooling pot 16. In this state, the bottom 4 of the preform 1 and a part of the peripheral portion 3 continuous with the bottom 4 are slightly increased in diameter while following the shape of the inner wall surface 16*a* of the cooling pot 16. Thus, their lengths become somewhat shorter, and the thickness of the bottom 4 is slightly decreased relative to FIG. 5(*a*). At this time, the inner wall surfaces 17*a* of the heating blocks 17 are opposed, in a noncontact manner, to the outer circumferential surface of a site of the trunk 3 of the preform 1, excluding the lower site 3*a*. By the actions and method described above, the bottom 4 and the part of the peripheral portion 3 continuous with the bottom 4 are cooled overall and rendered lower in temperature than the trunk 3. As a result, the wall thickness of the resin can easily remain in the bottom of the container after blowing.

Furthermore, the temperature control core 13 is lowered via the pressing drive means of the core base 21, whereby the core 22 can be inserted into the preform 1. At this time, the lower-limit position of the cooling core portion 23 serving as the leading end of the temperature control core 13 is defined as the position where the cooling core portion 23 can lightly contact the inner circumferential surface of the bottom 4 of the preform 1 and the lower site 3*a* of the trunk 3 continuous with the bottom 4. The shapes of the bottom 4 of the preform 1 and the part of the peripheral portion 3 continuous with the bottom 4 remain substantially unchanged, from the point in time of FIG. 5(*b*) onwards. Because of the above-described actions and method, it becomes possible to cool the bottom 4 of the preform 1 and the part of the peripheral portion 3 continuous with the bottom 4 from inside and outside simultaneously, while maintaining their wall thicknesses. By this procedure, whitening of the bottom 4 due to slow cooling can be considerably suppressed. The front end shape of the cooling core portion 23 is desirably flat rather than pointed, so that the area of contact with the inner surface of the bottom 4 of the preform 1 is increased to raise the efficiency of cooling.

If the bottom of the container is to be formed with a larger wall thickness, it is desirable to keep the bottom 4 of the preform 1 and the cooling pot 16 in disjunction at a point in time at which the temperature control core 13 is lowered. As will be seen from FIGS. 6(*a*) and 6(*b*), there is little difference in the longitudinal-axis length between the preform 1 after temperature control (FIG. 6(*a*)) and the container 25 after blow molding (FIG. 6(*b*)). That is, longitudinal-axis stretching minimally takes place in blow molding. Thus, the shape of the bottom 26 of the final container 25 tends to be similar to the shape of the bottom 4 of the preform 1 (and the part of the peripheral portion 3 continuous with the bottom 4) after temperature control. If the cooling core portion 23 is inserted into the preform 1 without descent of the cooling pot 16, there is a possibility that the bottom 4 will be pressed and collapsed. As a result, the bottom 4, the part of contact with the cooling core portion 23, will be thin-walled, or the shape of the cooling core portion 23 will remain as a mark on the inner surface of the bottom 4.

From the viewpoint of positively deforming the bottom 4 into a shape resembling the shape of the bottom of the final container at the stage of temperature control, however, it can be said that the pressing of the bottom 4 by the cooling pot 16 and the cooling core portion 23 is a method worth utilizing. In FIG. 5(*c*), such a method is illustrated. It should be noted, however, that the thickness of the bottom of the final container will be smaller than in the method of FIG. 5(*b*).

The temperature control pot 12 and the temperature control core 13 are brought closer to each other than in FIG. 5(*b*). As a result, the inner circumferential surface of the bottom 4 of the preform 1 and the lower site 3*a* of the trunk 3 continuous with the bottom 4 is pressed against the cooling core portion 23 of the core 22. Also, the outer circumferential surface of the bottom 4 of the preform 1 and the lower site 3*a* of the trunk 3 continuous with the bottom 4 is pressed against the inner wall surface 16*a* of the cooling pot 16.

That is, the bottom 4 of the preform 1 and the lower site 3*a* of the trunk 3 continuous with the bottom 4 are mechanically compressed and held between the temperature control pot 12 and the temperature control core 13.

Consequently, the material of the thick-walled bottom 4 of the preform 1 flows toward the lower site 3*a* of the trunk 3 continuous with the bottom 4 to cause deformation. As a result, the inner circumferential surface of the bottom 4 and the lower site 3*a* of the trunk 3 continuous with the bottom 4 reliably makes intimate contact with the cooling core portion 23 of the core 22. On the other hand, the outer circumferential surface of the bottom 4 and the lower site 3*a* of the trunk 3 continuous with the bottom 4 is pressed by the inner wall surface 16*a* of the cooling pot 16 and reliably brought into intimate contact therewith.

By performing the above-described pressing of the preform bottom, therefore, the wall thickness of the lower site 3*a* of the trunk 3 continuous with the bottom 4 is sufficiently ensured, and the inner circumferential surface and the outer circumferential surface of the bottom 4 and the lower site 3*a* of the trunk 3 continuous with the bottom 4 are simultaneously contacted with and cooled by the inner wall surface 16*a* of the cooling pot 16 and the cooling core portion 23, with the inner and outer circumferential surfaces maintaining the desired shape (a shape resembling the bottom shape of the final container).

At the same time, the site 3*b* of the trunk 3, which is other than the bottom 4 of the preform 1 and the lower site 3*a* of the trunk 3 continuous with the bottom 4, is heated in a noncontact manner between the inner wall surfaces 17*a* of the heating blocks 17 and the core 22 at the site other than the cooling core portion 23. Under these conditions, an insufficiency of the necessary internal heat quantity for blow molding can be avoided within the range of the peripheral portion and the bottom to be blow-molded.

In the manner described above, the bottom 4 of the preform 1 is cooled, the lower site 3*a* of the trunk 3 continuous with the bottom 4 is cooled, and the site 3*b* of the trunk 3 other than the lower site 3*a* of the trunk 3 is heated in a stretchable state, whereby the temperature and shape of the preform 1 (a shape resembling the bottom shape of the final container) are adjusted to the desired state.

For example, cooling is performed, with the wall thicknesses at sites near the bottom 4 of the preform 1 and the lower site 3*a* of the trunk 3 continuous with the bottom 4 being ensured. Thus, during blow molding in the subsequent step, their shape is to be ensured. On the other hand, the wall thickness of the site 3*b* of the trunk 3 of the preform 1 is rendered relatively small. In this state, the site 3*b* can be heated such that it is uniformly stretchable during blow molding in the subsequent step.

What temperature distribution should be imparted to the preform 1 by the temperature control apparatus 11 and the temperature control method described above is changed according to the shape or weight of the preform 1, the state of a temperature distribution present since injection molding, the shape of the final container, the required standard values, etc. In the embodiment, the temperature control pot 12 is initially raised, but this is not limitative, if the temperature control pot 12 and the temperature control core 13 are used in combination. Concretely, the length of the temperature control time, and which of the temperature control core 13 and the temperature control pot 12 should be separated first from the preform 1 (which of the cooling time and the heating time should be made longer) may be changed, as appropriate, in order to impart an appropriate temperature distribution to the preform 1.

The preform 1 adjusted to a predetermined shape (wall thickness) and a predetermined temperature by the temperature control apparatus 11 is biaxially stretched by blow molding. As shown in FIG. 6(*b*), the preform 1 is molded into a container (resin container) in which the wall thicknesses of the bottom 4 and the lower site 3*a* of the trunk 3 continuous with the bottom 4, cooled in the desired state, have been maintained; the site 3*b* of the trunk 3 of the preform 1, heated to ensure stretchability, has been stretched uniformly with a relatively thin wall; and the degree of transparency and the degree of gloss have been maintained uniform, without an uneven wall thickness distribution in the bottom or the trunk. In order to shape the thick-walled bottom 26 satisfactorily, it is desirable to carry out a molding method for intentionally delaying the driving of a bottom mold at the time of biaxial stretching, a so-called raised bottom delay molding method. Since this method has been made publicly known, for example, by the applicant's Japanese Patent Gazette (Japanese Patent No. 2107926), its detailed explanations is omitted herein.

Figure 7:
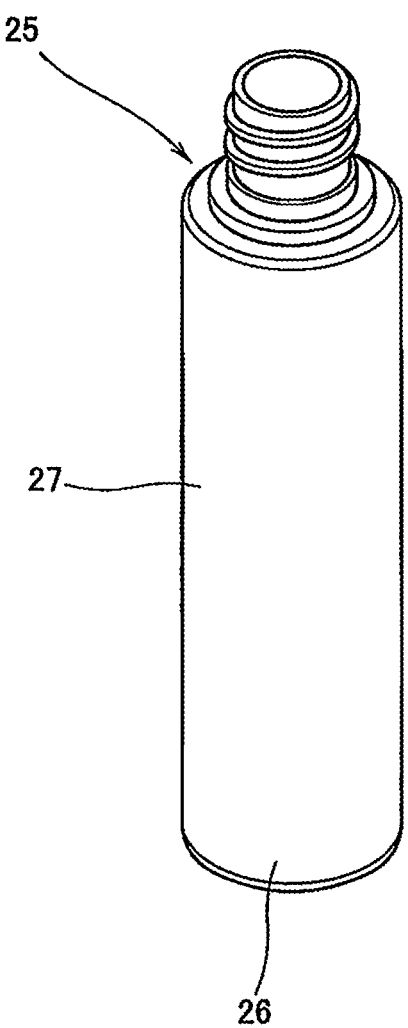
FIG. 7 is a front perspective view of the container.

As shown in FIG. 7, the blow-molded container 25 is the container 25 which has the strength of its bottom 26 sufficiently ensured, which is free from a wall thickness distribution in its peripheral portion (trunk) 27, and whose degree of transparency and degree of gloss are kept uniform. The container 25 can be used, for example, as a container for cosmetics, etc. whose look matters.

According to the temperature control method for a preform using the above-described temperature control apparatus 11, therefore, it is possible to obtain a container 25 improved in look. It is also possible to obtain a resin container in which a thick-walled bottom and a thin-walled uniform-thickness trunk are adjacent. In addition, it becomes possible to provide a method for producing a resin container, the method being capable of yielding a resin container which has been prepared using a preform temperature-controlled by the temperature control method for a preform and whose look has been improved.

Examples of the resin usable in the present apparatus and method are polyethylene terephthalate (PET) and polypropylene (PP).

INDUSTRIAL APPLICABILITY

The present invention can be utilized in the industrial fields of a temperature control apparatus for a preform and a temperature control method for a preform, which apparatus and method control the temperature of an injection molded preform. The present invention can also be utilized in the industrial fields of a resin container, and a method for producing a resin container.

EXPLANATIONS OF LETTERS OR NUMERALS

1 Bottomed preform (preform)
2 Mouth/head
3 Peripheral portion (trunk)
4 Bottom
6 Rotary table
7 Neck mold
11 Temperature control apparatus
12 Temperature control pot
13 Temperature control core
15 Pot base
16 Cooling pot
17 Heating block
18 Coupling stand
19 Pressing drive means (raising/lowering device)
21 Pressing drive means (core base)
22 Core
23 Leading end portion (cooling core portion)
25 Container (final container)
26 Bottom
27 Peripheral portion (trunk).

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A temperature control method for a preform, designed to obtain a resin container having a thick-walled bottom and a thin-walled uniform-thickness trunk adjacent to each other, comprising:
    forming a bottomed preform by injection molding, the bottomed preform having a bottom and a peripheral portion continuous with the bottom, and having a wall thickness of the bottom increased relative to the peripheral portion;
    bringing an outer circumferential surface of the bottom of the bottomed preform and a part of the peripheral portion continuous with the bottom into intimate contact with a temperature control pot, while holding the outer circumferential surface by the temperature control pot, for temperature control; and
        relatively heating a site of the peripheral portion, excluding the part of the peripheral portion continuous with the bottom of the bottomed preform, to a predetermined temperature,
    wherein in the step of contacting the temperature control core and the bottom of the preform and the lower side of the trunk continuous with the bottom, the bottom of the preform and the lower side of the trunk continuous with the bottom are mechanically pressed between the inner wall surface of the cooling pot and the temperature control core to deform the bottom to a thinner thickness and to a shape closer to corresponding to a shape of the bottom of a final container, and
    wherein the temperature control core has a cooling core portion at its lower end having a quadrilateral shape for contacting portions of the preform which will become corners of a resulting quadrilateral shaped container, and there is a step of contacting the bottom of the preform with the quadrilateral shape of the temperature control core to form the bottom.

2. The temperature control method for a perform, designed to obtain a resin container having a thick-walled bottom and a thin-walled uniform-thickness trunk adjacent to each other, according to claim 1, wherein
    the bottom and the part of the peripheral portion continuous with the bottom are disposed between a pot for cooling and a core for cooling, and the pot for cooling and the core for cooling are brought close to each other, whereby the outer circumferential surface of the bottom and the part of the peripheral portion continuous with the bottom is cooled upon intimate contact with the pot for cooling, and an inner circumferential surface of the bottom and the part of the peripheral portion continuous with the bottom is cooled upon intimate contact with the core for cooling.

3. The temperature control method for a perform, designed to obtain a resin container having a thick-walled bottom and a thin-walled uniform-thickness trunk adjacent to each other, according to claim 2, wherein
    the peripheral portion of the bottomed preform, excluding the bottom and the part of the peripheral portion continuous with the bottom, is relatively heated to a predetermined temperature either in a completely noncontact state, or in a partly contacted state on an inner circumferential surface of the peripheral portion.

4. The temperature control method for a preform, designed to obtain a resin container having a thick-walled bottom and a thin-walled uniform-thickness trunk adjacent to each other, according to claim 1, wherein
    the temperature control member has an inner wall surface radially spaced outward from the peripheral portion of the walls of the bottomed preform and radially spaced outward with respect to an inner wall surface of the temperature control pot, and the side walls of the preform, excluding the part of the peripheral portion continuous with the bottom of the preform, are heated by temperature control member.

5. The temperature control method for a preform, designed to obtain a resin container having a thick-walled bottom and a thin-walled uniform-thickness trunk adjacent to each other, according to claim 1, wherein
    the quadrilateral shape of the lower end of the cooling core portion is a flat shape for contacting and pressing a bottom of the preform, and in the step of contacting the bottom of the preform the flat shape of the quadrilateral shape of the lower end of the temperature control core is used to form the bottom.

6. The temperature control method for a preform, designed to obtain a resin container having a thick-walled bottom and a thin-walled uniform-thickness trunk adjacent to each other, according to claim 1, wherein
    when a lower limit of motion of the temperature control core is reached, the temperature control core continues to cool the bottom of the preform.

7. A temperature control apparatus for a preform, designed to obtain a resin container having a thick-walled bottom and a thin-walled uniform-thickness trunk adjacent to each other, comprising:
    a temperature control pot for holding an outer circumferential surface of a bottom of a bottomed preform and a part of a peripheral portion of the bottomed preform continuous with the bottom;
    a temperature control block disposed outside the peripheral portion of the bottomed preform;

a temperature control core inserted into an inside of the bottomed preform, and having a leading end portion contacting an inner circumferential surface of the bottom and the part of the peripheral portion continuous with the bottom; and pressing drive means for holding a bottom wall surface of the bottomed preform between the temperature control pot and the temperature control core, and bringing the temperature control pot and the temperature control core close to each other relatively so as to make intimate contact with the bottom and the part of the peripheral portion and hold them, wherein the temperature control pot is a pot for cooling, the temperature control core is a core for cooling, and the temperature control block is a block for heating, and wherein the bottomed preform has the bottom increased in wall thickness relative to the peripheral portion continuous with the bottom, the wall thickened bottom being disposed between the temperature control pot and the temperature control core, and wherein the temperature control core has a cooling core portion at its lower end having a quadrilateral shape for contacting portions of the preform which will become corners of a resulting quadrilateral shaped container.

8. The temperature control apparatus for a preform, designed to obtain a resin container having a thick-walled bottom and a thin-walled uniform-thickness trunk adjacent to each other, according to claim 7, wherein the temperature control block has an inner wall surface radially spaced outward from the peripheral portion of the walls of the bottomed preform and radially spaced outward with respect to an inner wall surface of the temperature control pot.

9. The temperature control apparatus for a preform, designed to obtain a resin container having a thick-walled bottom and a thin-walled uniform-thickness trunk adjacent to each other, according to claim 7, wherein the quadrilateral shape of the lower end is a flat shape for contacting and pressing a bottom of the preform.

\* \* \* \* \*